April 21, 1959 G. F. HAUSMANN 2,882,992
LOW-DRAG EXHAUST SILENCER
Filed April 15, 1957

INVENTOR
GEORGE F. HAUSMANN
BY Leonard F. Wakefield
ATTORNEY

United States Patent Office 2,882,992
Patented Apr. 21, 1959

2,882,992

LOW-DRAG EXHAUST SILENCER

George F. Hausmann, Glastonbury, Conn., assignor to United Aircraft Corporation, East Hartford, Conn., a corporation of Delaware Application April 15, 1957, Serial No. 652,757

6 Claims. (Cl. 181—60)

This invention relates to jet power plant exhaust silencers and more particularly to silencers which comprise a plurality of small jet openings for noise reduction.

It is a prime object of this invention to provide a silencer configuration which has good silencer characteristics at take-off with compromised take-off thrust, but which has a minimum compromise in thrust and external drag at cruise conditions.

It is another object of this invention to provide a jet exhaust which includes a central body and a plurality of radially extending struts with the aft portion of both the struts and the body divided into a large number of relatively small jet exhaust openings.

It is a furthere object of this invention to provide a jet exhaust of the type described including means for moving the aft portion of the struts out of alignment with respect to upstream portions whereby the aft portions intercept the exhaust flow and then break up the main stream into a plurality of small jet streams.

These and other objects of this invention will become readily apparent from the following detailed description of the drawing in which:

Fig. 1 schematically illustrates a jet power plant having an exhaust nozzle according to this invention;

It has been demonstrated in tests that turbojet exhaust noise may be effectively reduced by the use of a plurality of small nozzles in place of the single jet opening.

It is known that the use of small holes or nozzles in place of a single exhaust opening is good for silencing. When a fixed configuration of small holes exclusively is used, net thrust losses are incurred at cruise for several reasons. There are internal pressure losses due to the small internal flow passage. Small nozzles are also inefficient. There is also a loss due to negative pressures on the surfaces between the small holes or nozzles. Form drag also exists due to the external protuberances.

Thus, it is a purpose of this invention to provide no external drag other than friction drag whereby the cruise thrust is bettter than the net cruise thrust of a fixed silencer having small holes. Thus, herein silencing is provided at take-off with small holes, while large openings are provided at cruise with the small silencing holes being vented.

Figure 1:
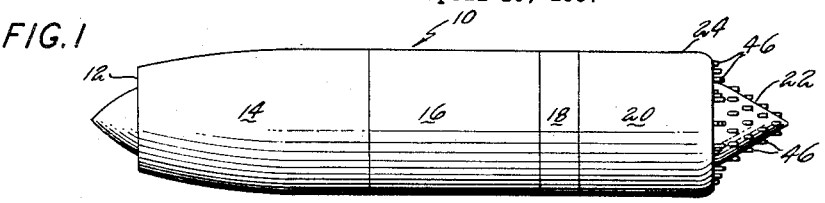

Referring to Fig. 1, a typical turbojet power plant is generally indicated at 10 as having an inlet 12, a compressor section 14, a burner section 16, a turbine section 18 and an exhaust nozzle section 20. The exhaust nozzle 20 includes a central body which terminates in a tailcone 22 extending beyond the aft end of the nozzle exterior casing 24.

Figure 2:
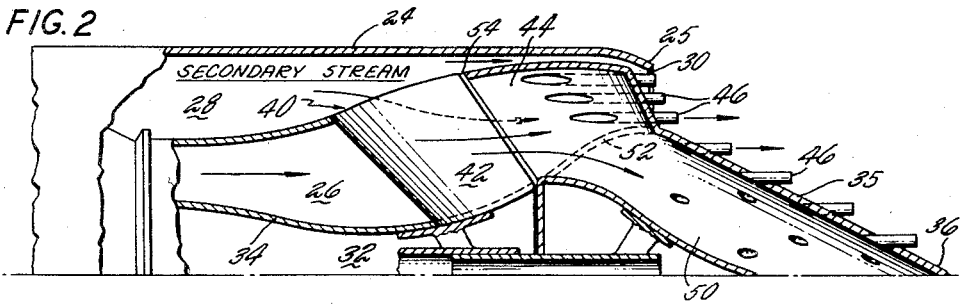
Fig. 2 is a cross-sectional illustration of the nozzle taken along the line 2—2 of Fig. 3.

Referring to Fig. 2, the exterior casing 24 is illustrated as terminating in a small boattail 25 which aids in reducing the base drag. The outer casing 24 defines a main exhaust passage. An annular duct 26 is located in said main passage and is spaced inwardly from the outer casing 24. Between the annular duct 26 and the casing 24 there is a secondary passage or duct 28 which normally carries cooling air around the main exhaust duct 26. Some of the cooling air may be expelled through the aft opening 30 formed between the boattail 25 and the aft end of the duct 26. An inner body 32 is symmetrically located within the main passage formed by the outer casing 24 and is located inwardly from the annular duct 26. The inner body 32 includes a wall 34 which also serves as the inner wall defining the duct 26. The inner body 32 terminates in an aft conical portion 35 whose trailing edge 36 extends beyond the aft end of the casing 24 and its boattail 25. A plurality of struts generally indicated at 40 extend radially from the wall 34 of the inner body 32 through the annular duct 26. The struts 40 comprise upstream portions 42 and downstream portions 44. The strut portions 42 and 44 are hollow for reasons apparent hereinafter.

The downstream strut portions 44 and the aft portion 35 of the inner body include a plurality of small jet openings 46 at the trailing edge thereof for emitting the exhaust fluid in small streams. It is well known that breaking up the exhaust stream into a number of small streams reduces the noise level of the jet exhaust considerably.

According to this invention the downstream portions 44 of the struts 40 are connected to the conical aft portion 34 of the inner body 32 to form an integral member which can be rotated about the longitudinal axis of the exhaust nozzle. Any suitable mechanism may be provided for rotating this integral member and this mechanism may take the form as schematically illustrated in patent application Serial No. 466,070 filed November 1, 1954, by George F. Hausmann, now Patent No. 2,847,822.

Figure 3:
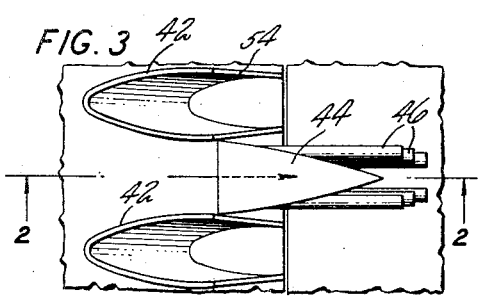
Fig. 3 is a top view of the nozzle in partial cross section showing the relation of the parts in the silencing position.

Referring to Figs. 2 and 3, the parts are illustrated in the take-off or silencing position. In this position of the parts the downstream strut portions 44 have been moved to an intermediate position between the upstream strut portions 42 so as to intercept the exhaust stream which is flowing between the upstream strut portions 42. The exhaust intercepted by the downstream portions 44 is conducted to the plurality of small nozzles 46 carried by the downstream strut portion and this fluid is also conducted through the passage 50 formed in the aft conical section 34 of the inner body 32. The flow moving into the chamber 50 flows through a passage 52 in the bottom of the downstream strut portion 44. In this position of the parts all the exhaust stream is emitted through the relatively small jet nozzles 46 in both downstream strut 44 and the aft conical portion 35.

It should be pointed out that the upstream strut portion 42 is open at the top and closed at the bottom while the downstream portion 44 is closed at the top and has an opening 52 in the bottom thereof.

In the position shown in Figs. 2 and 3 the aft ends 54 of the upstream strut portions 42 present a relatively large area which normally have a relatively low pressure therebehind to cause high base drag. However, due to the fact that the upstream strut portion 42 is hollow, fluid may flow from the secondary duct or passage 28 down through the upstream portion 42 and out the aft end thereof. This will relieve the relatively low pressure immediately behind the blunt trailing edge of the upstream strut portions 42. In fact, the secondary stream will be partially ejected from the aft end 54 of the upstream strut portion 42 by reason of the jet streams being emitted through the plurality of nozzles 46. In other words, the secondary stream will be entrained to flow down through the strut portion 42 and out to the trailing edge of this portion.

Figure 5:
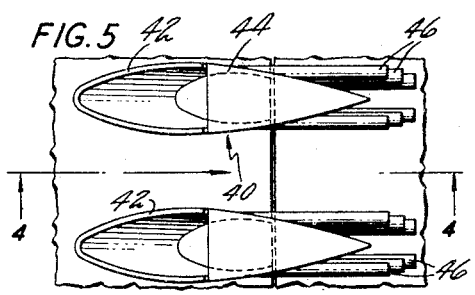
Fig. 5 is a top view in partial cross section of a portion of the nozzle indicating the parts in the nonsilencing or cruise position.
Figure 4:
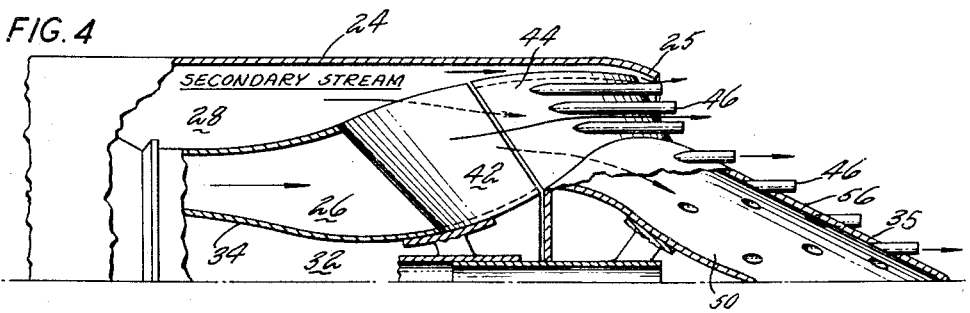
Fig. 4 is a cross-sectional view taken along the line 4—4 of Fig. 5.

As seen in Figs. 4 and 5 the parts are shown in the cruise or nonsilencing position. With this arrangement as seen, for example, in Fig. 5, the upstream and downstream portions 42 and 44, respectively, are in alignment with each other. In this position the main exhaust stream will flow in the passages between the struts and will be free to be emitted in an aft direction. In this position of the parts there will of course be some base drag on the trailing edges of the strut portion 44 and the spaces 56 on the conical aft section 35 in between the individual nozzles 46. However, this base drag can be relieved by providing at least a small amount of fluid flow out of the nozzles 46. This is accomplished as better seen in Fig. 4 by passing secondary air from the secondary duct 28 down through the hollow downstream strut portion 44. This secondary air will then flow out of the small nozzles 46 in the trailing edge of the aft strut portion 44 and also into the chamber 50 inside the conical aft portion 34. Thus, the secondary flow being emitted, the cruise conditions from the nozzles 46 would relieve at least somewhat the small amount of base drag caused by the relatively low pressure regions in the spaces 56 between the nozzles 46.

As a result of this invention it is apparent that a highly efficient silencer has been provided having jet exhaust at a relatively low cost in drag. Furthermore, the entire mechanism and the exhaust streams are contained within the confines of the outer diameter of the exhaust nacelle. Furthermore, a silencer has been provided at a relatively low cost in net thrust.

Although only one embodiment of this invention has been illustrated and described herein, it will be apparent that various changes and modifications may be made in the construction and arrangement of the various parts without departing from the scope of this novel concept.

What it is desired by Letters Patent is:

1. In a jet exhaust for a power plant including an outer casing forming a main passage, a central inner body coaxially disposed in said passage and terminating in an aft hollow conical member which extends aft beyond said casing, a plurality of struts radially extending from said body and terminating in outward ends which are spaced inwardly from said casing, said struts including upstream and downstream portions with at least one of said portions being hollow, means for ducting secondary flow through said hollow strut portion and into said aft conical member, means for simultaneously rotating said downstream strut portions about the longitudinal axis of said main passage out of alignment with respect to said upstream portions, said downstream strut portions intercepting the fluid flowing between said upstream portions when moved out of alignment relative thereto, and a plurality of relatively small openings in said downstream portion and said aft conical member for emitting said fluid flow at a reduced noise.

2. In a jet exhaust nozzle having a main outer casing forming a main passage, a duct in said passage and spaced inwardly from said casing, a secondary duct between said casing and said first-mentioned duct, an inner central body in said passage, a plurality of hollow struts adjacent the aft end of said duct and radiating from said inner body, an aft hollow portion of said central body, said struts comprising upstream and downstream portions with one of said portions being open at its outer end for receiving gas from said secondary duct, said downstream portions being connected to the aft portion of said central body and forming a movable unit, means for rotating said unit around the axis of said passage whereby the downstream portions of said struts are out of alignment with respect to said upstream portions, a plurality of openings in the trailing edge surfaces of both said downstream strut portions and the aft end of said central body, and an opening in the bottom of the downstream portions of said struts for conducting gas from said one portion and said secondary duct to the inside of the aft end of said central body.

3. In a jet exhaust nozzle having a main outer casing forming a main passage, a duct in said passage and spaced inwardly from said casing for conducting the main exhaust flow, an inner central body in said passage and forming an inner wall of said duct, a secondary gas passage formed between the outer wall of said duct and said casing, a plurality of hollow struts adjacent the aft end of said duct and radiating from said inner body, said hollow struts adapted to receive at their upper ends fluid flow from said secondary passage, an aft hollow portion of said central body, said struts comprising upstream and downstream portions, said downstream portions being connected to the aft portion of said central body and forming a movable unit, means for rotating said unit around the axis of said passage whereby the downstream portions of said struts are out of alignment with respect to said upstream portions and whereby the main flow through said duct is intercepted by the downstream portions of said struts, means for conducting a portion of said intercepted flow into the aft end portion of said body, and a plurality of openings in the trailing edge surfaces of both said downstream strut portions and the aft end of said central body.

4. In a power plant having a jet exhaust, an outer casing forming a main passage, a first annular duct in said passage spaced inwardly from said casing, said duct carrying the main flow of exhaust fluid, a second annular duct between said casing and said first annular duct, an inner body located centrally of said main passage and inwardly of said first annular duct including an aft hollow conical portion extending beyond the downstream end of said casing, a plurality of struts radiating from said inner body and through said first annular duct, said struts comprising hollow upstream and downstream portions, said upstream portion being open at its outer end and communicating with said second annular duct, means connecting together said downstream strut portions and the aft end of said body to form an integral unit which is symmetrical with respect to the longitudinal axis of said main passage, said downstream portion having a fluid connection between the hollow portion of said upstream strut portion and said aft hollow conical portion, means for rotating said unit whereby the hollow portions of said downstream portions intercept the flow through said duct which flows between said upstream portions, means for conducting a portion of said intercepted flow into said aft end of said body, and a plurality of openings in said downstream portions and said aft end for discharging said intercepted flow.

5. In a power plant having a jet exhaust, an outer casing forming a main passage, a first annular duct in said passage spaced inwardly from said casing, said duct carrying the main flow of exhaust fluid, a secondary annular duct between said casing and said first annular duct, an inner body located centrally of said main passage and inwardly of said first annular duct including an aft hollow conical portion extending beyond the downstream end of said casing, a plurality of struts radiating from said inner body and through said first annular duct, said struts comprising hollow upstream and downstream portions, means connecting together said downstream strut portions and the aft end of said body to form an integral unit which is symmetrical with respect to the longitudinal axis of said main passage, means for rotating said unit whereby the hollow portions of said downstream portions intercept the flow through said duct which flows between said upstream portions, means for conducting a portion of said intercepted flow into said aft end of said body, each said hollow upstream strut portion including an opening adjacent its outer end for receiving fluid from said secondary duct and emitting said fluid to the airstream to relieve the base drag of the trailing edge of said upstream portion when said downstream portion is in its intercepting position, and a plurality of openings in said downstream portions and said aft end for discharging said intercepted flow.

6. In a jet exhaust nozzle having a main outer casing forming a main passage, a first duct in said passage and spaced inwardly from said casing, a secondary duct between said casing and said first-mentioned duct, an inner central body in said passage, a plurality of hollow struts adjacent the aft end of said duct and radiating from said inner body, said struts passing through said first duct and terminating adjacent said secondary duct, an aft hollow portion of said central body, said struts comprising upstream and downstream portions with said upstream portion being open at its outer end for receiving gas from said secondary duct, said downstream portions being connected to the aft portion of said central body and forming a movable unit, means for rotating said unit around the axis of said passage whereby the downstream portions of said struts are out of alignment with respect to said upstream portions, a plurality of openings in the trailing edge surfaces of both said downstream strut portions and the aft end of said central body, and an opening in the bottom of the downstream portions of said struts for conducting gas from said upstream portion and said secondary duct to the inside of the aft end of said central body.

References Cited in the file of this patent

UNITED STATES PATENTS

| | | |
|---|---|---|
| 2,249,271 | Davis | July 15, 1941 |
| 2,588,532 | Johnson | Mar. 11, 1952 |
| 2,639,579 | Willgoos | May 26, 1953 |
| 2,845,775 | Tyler et al. | Aug. 5, 1958 |

FOREIGN PATENTS

| | | |
|---|---|---|
| 733,362 | Great Britain | July 13, 1955 |

OTHER REFERENCES

Publication: "A Jet Exhaust Silencer," by Tyler and Towle, in Noise Control, July 1955, pages 37–41 and 54 (page 41 relied on). (Copy available in Div. 18.)